Figure 5:
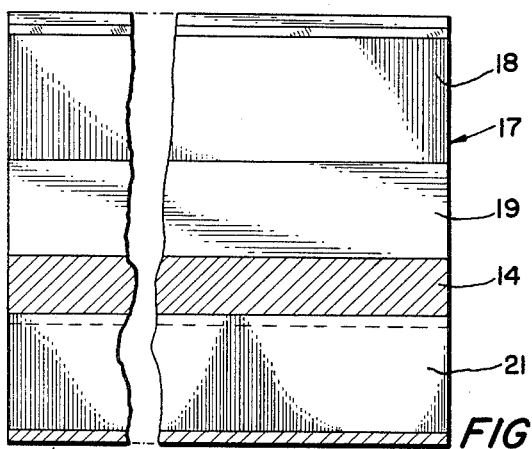

Feb. 9, 1965  H. B. GAYLEY  3,168,925
CUTTING INSERTS FOR ROCK DRILL BITS
Filed April 26, 1963  2 Sheets-Sheet 1
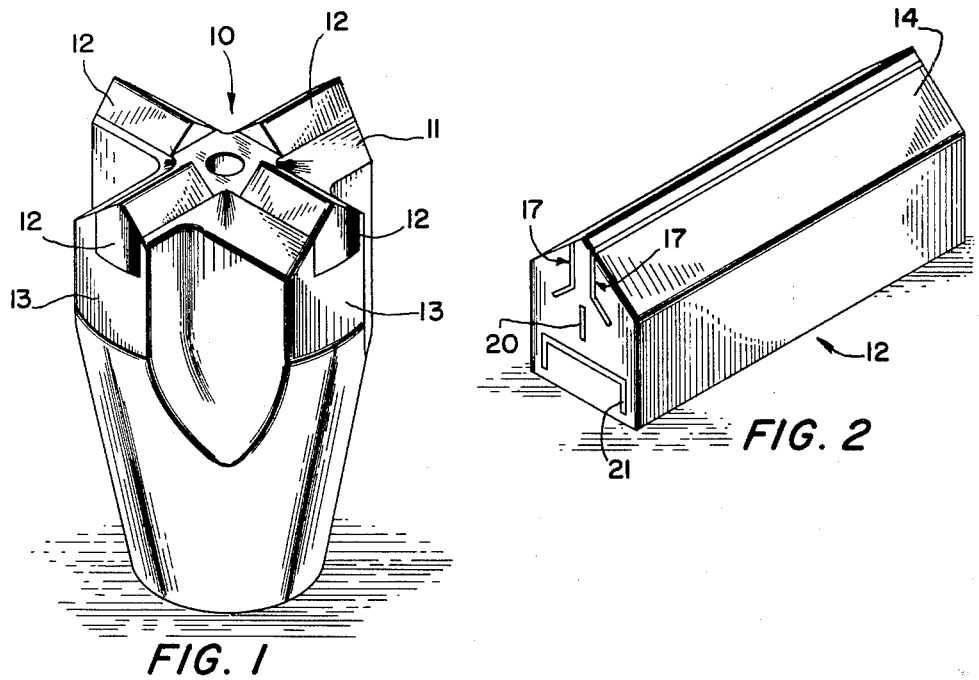
FIG. 1
FIG. 2
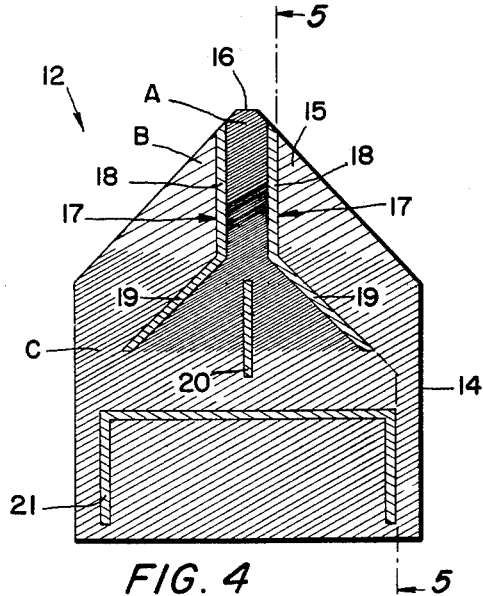
FIG. 4
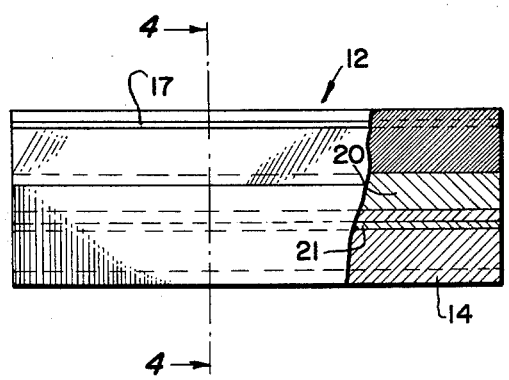
FIG. 3
INVENTOR.
HARRY B. GAYLEY
BY
ATTORNEY Feb. 9, 1965  H. B. GAYLEY  3,168,925
CUTTING INSERTS FOR ROCK DRILL BITS
Filed April 26, 1963  2 Sheets-Sheet 2

INVENTOR.
HARRY B. GAYLEY
BY
Arthur Frederick
ATTORNEY

United States Patent Office 3,168,925
Patented Feb. 9, 1965

3,168,925
CUTTING INSERTS FOR ROCK DRILL BITS
Harry B. Gayley, Bound Brook, N.J., assignor to Ingersoll-Rand Company, New York, N.Y., a corporation of New Jersey
Filed Apr. 26, 1963, Ser. No. 275,911
9 Claims. (Cl. 175—410)

This invention relates to rock drill bits and more particularly to cutting inserts or teeth which are suitably secured in the body of a rock drill bit.

Industry has been continuously striving to obtain for rock drill bits cutting inserts which have a high resistance to wear and a high resistance to fracture or crumbling under the stresses imposed thereon due to the impact shocks to which they are subjected during percussive drilling.

Presently, cutting inserts fail to meet the aforementioned requirements because a homogeneous mixture of one or more carbides, such as tungsten carbide, and one or more bonding metals, such as cobalt or other metals in the iron group, providing those aforementioned desirable characteristics cannot be obtained. The reason for this is that a sintered alloy composition having a relatively low cobalt content in relation to the percentage of carbide, while having desirable hardness and wear resistant qualities, is relatively brittle and unable to absorb the shock strains to which the rock drill bit is subjected. Conversely, a sintered alloy composition having a relatively high content of cobalt in relation to carbide, while more ductile and, therefore, more resistant to shock strains, does not have sufficient resistance to wear for most drilling applications. In view of the foregoing, present compositions of cutting inserts vary from about 5% cobalt to about 15% cobalt, cutting insert compositions outside of this range being too brittle or not sufficiently wear resistant.

Cutting inserts composed of alloy compositions which are a compromise between hardness, wear resistance, and shock resistance, impose limitations on increasing the drilling capability of drilling equipment. Another disadvantage of present cutting inserts is the frequency with which they must be resharpened.

It is, therefore, an object of this invention to provide for rock drill bits a cutting insert of sintered alloy having desirable hardness and resistance to wear together with a higher resistance to shock strains than heretofore constructed cutting inserts.

Another object of the present invention is to provide for rock drill bits a cutting insert of sintered alloy which has self-sharpening characteristics and thereby substantially reduces the frequency at which the cutting insert must be resharpened.

A further object of this invention is to provide for a rock drill bit a cutting insert of longer operative life than presently known cutting inserts.

Accordingly, the present invention contemplates a novel cutting insert comprising a pair of closely spaced, parallel metal strips embedded in the body of the insert and extending in a plane parallel to the sides of the body and terminating adjacent the cutting edge of the body. The body of the insert is composed of various alloy compositions of one or more carbides or other hard material, such as tungsten carbide, and cobalt or other metals in the iron group arranged so that an allow composition having the greatest resistance to wear is disposed between the pair of metal strips. With the alloy composition having the greatest wear resistant characteristic confined in an area extending inwardly from the initially formed cutting edge, wear in the cutting edge surface area will be less than in the adjacent surface areas so that a relatively sharp cutting edge will be maintained as the cutting insert wears while in use.

The cutting insert in accordance with this invention may also be provided with metal plates or strips embedded in the body thereof, preferably in the shape of an integral three-sided form, to reinforce the body and thereby render the cutting insert more resistant to shock strains.

Figure 6:
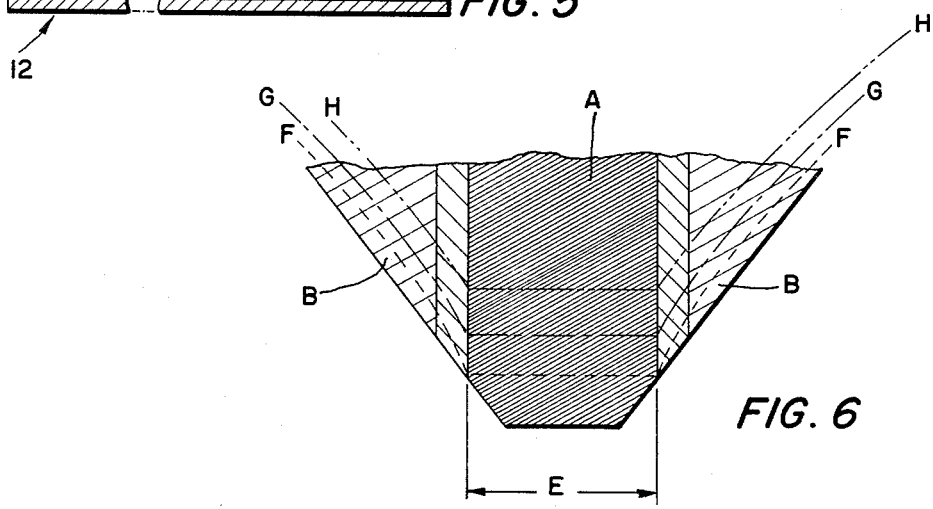
Figure 7:
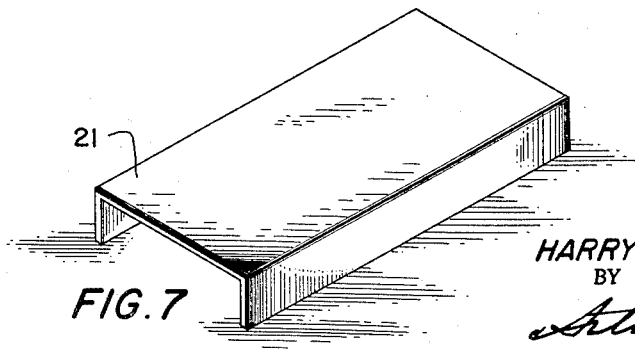

The invention will be more fully understood from the following detailed description thereof when considered in connection with the accompanying drawing wherein one embodiment of the invention is illustrated by way of example and in which:

FIG. 1 is a view in perspective of a drill bit for a rock drill having secured in the working face thereof cutting inserts according to this invention, FIG. 2 is a view in perspective of a cutting insert according to this invention, FIG. 3 is a side elevational view of a cutting insert of this invention with parts thereof broken away for illustrative purposes, FIG. 4 is a transverse sectional view taken substantially along line 4—4 of FIG. 3, somewhat enlarged, FIG. 5 is a longitudinal sectional view taken substantially along line 5—5 of FIG. 4, FIG. 6 is a schematic drawing of the cutting edge portion of the cutting insert according to this invention illustrating the self-sharpening characteristics thereof, and FIG. 7 is a perspective view of a metal insert which is embedded in the body of the cutting insert.

Now referring to the drawings and more particularly to FIG. 1, 10 generally designates a conventional type of percussive rock drill bit, in the working face 11 of which are secured, as by brazing, welding, or the like, a plurality of cutting inserts 12 according to this invention. While cutting inserts 12 are shown in association with a rock drill bit having four wing portions 13, the cutting inserts have application to rock drill bits of a wide variety of designs including rock drill bits without wing portions and those having two or more wing portions.

Cutting inserts 12, as best shown in FIGS. 2 to 5, comprise an elongated body having a portion 14 substantially rectangular in cross section and an integral, substantially equilateral triangular portion 15, the latter forming at the apex of the triangle a cutting edge 16. The cutting insert is composed of a plurality of alloys A, B, and C comprising various mixtures of one or more carbides, such as tungsten carbide, and one or more bonding metals, such as cobalt metals of the iron group. Alloy A employed in the body of the cutting insert 12 comprises an alloy having relatively high hardness and resistance to wear characteristics, such as an alloy having a relatively low cobalt content. Alloy B employed in the body of the cutting insert 12 comprises an alloy having a relatively high resistance to impact strains and low resistance to wear, such as an alloy having a relatively high cobalt content. Alloy C used in the body portion 14 of the cutting insert 12 has hardness, resistance to wear, and ductility characteristics intermediate that of alloys A and B. The location of alloys A, B, and C will hereinafter be more fully described.

Emedded in the body of cutting insert 12 is a pair of metal strips 17 which may be of any suitable metal such as molybdenum. Each metal strip 17 is preferably formed so that one section 18 thereof lies in a plane at an obtuse angle to the plane of the other section 19. Metal strips 17 are disposed in body portions 14 and 15 so that their respective sections 18 lie in relatively close spaced, parallel relationship with each other on opposite sides of cutting edge 16 and substantially parallel to the longitudinal side walls of body portion 14, while the respective sections 19 of the metal strips extend away from each other and in planes substantially parallel to the inclined surfaces of body portion 15. Metal strips 17 are dimensioned so that sections 18 extend from the inclined surfaces of the triangular body portion 15 substantially the full length of the altitude of triangular body portion and sections 19 project into body portion 14. Metal strips 17 serve to reinforce the body of cutting insert 12 and thereby render the cutting insert more resistant to impact shock strains. In addition, sections 18 of the metal strips 17 serve to define a cutting edge as the cutting insert undergoes wear, as will be more fully described hereinafter.

To further reinforce and to increase the resistance to shock strains, additional metal strips may be embedded in the body of cutting insert 12. As illustrated in the drawings, an elongated metal strip 20 may be disposed substantially centrally of the body between sections 19 of metal strips 17. While the metal strip 20 is shown as a single continuous strip extending the full length of the cutting insert, it is contemplated that a plurality of metal strips disposed in endwise alignment may be employed in place of metal strip 20 without departing from the scope and spirit of this invention.

In addition to metal strip 20, cutting insert 12 may be further reinforced by embedding a rectangular metal plate 21, U-shaped in cross section, in body portion 14 of cutting insert 12 (see FIG. 7).

To manufacture cutting inserts 12 according to this invention as herein described, a die (not shown) is provided, which die conforms to the size and shape of the cutting insert 12 desired, but arranged in an inverted position from that shown in FIG. 4. Metal strips 17, metal plate 21, and/or metal strip 20 are arranged in the die in positions relative to each other and the body of the cutting insert, which positions correspond to the positions illustrated in the drawings. Alloy B in the form of a powder is inserted in the die adjacent the surfaces of metal strip 17 remote from each other and, as shown in FIG. 4, to a point adjacent the body portion 14. Alloy A in the form of a powder is inserted in the area defined by metal strips 17. Thereafter, alloy C also in powder form is added to fill the remaining portions of the die. After the die is filled with alloys A, B, and C as above set forth, the alloys are compressed and bonded together by a sintering process. Although cutting insert 12 may be manufactured in the manner herein set forth, the invention is not to be limited thereto. Any other suitable method of manufacture may be employed without departing from the scope and spirit of this invention.

Cutting insert 12 as herein described constitutes a self-sharpening cutting insert. As best shown in FIG. 6, alloy A disposed between metal strips 17 has a higher degree of resistance to attrition and abrasion than alloy B adjacent the surfaces of metal strips 17 remote from each other. By reason of this difference in resistance to wear between alloys A and B, the surfaces formed by alloy B will undergo greater attrition than the surface composed of alloy A so that a cutting edge of a maximum width E is constantly maintained as the cutting insert is subjected to wear. This self-sharpening effect is schematically illustrated in FIG. 6 wherein the three broken lines F—F, G—G, and H—H represent three successive stages of wear and where, at each stage, a cutting edge of a maximum dimension E is maintained.

It is believed that it will now be obvious that an improved cutting insert has been provided for rock drill bits, which insert has a greater resistance to impact strains than heretofore cutting inserts. The invention also provides a cutting insert which has, by reason of its self-sharpening characteristic, a longer operative life than presently known cutting inserts.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

I claim:
1. A cutting insert for rock drill bits comprising, a body having two adjacent inclined wall surfaces forming a cutting edge, a pair of closely spaced strip means embedded in said body, each strip means extending substantially the length of said cutting edge and extending from the inclined wall surfaces on opposite sides of said cutting edge inwardly from said cutting edge, a first alloy having a relatively high resistance to wear forming a portion of the body between the pair of strip means, a second alloy having a relatively low resistance to wear forming the portion of the body adjacent the remote sides of the pair of strip means, and another alloy having a resistance to wear intermediate said first and second alloys forming the remainder of said body.

2. A cutting insert according to claim 1 wherein said pair of strip means are metallic strips.

3. A cutting insert according to claim 1 wherein a reinforcing means is disposed in said body remote from said cutting edge.

4. A cutting insert for rock drill bits comprising, a body having a portion substantially rectangular in shape in cross section and an integral portion substantially triangular in cross section, said triangular portion forming at the apex thereof a cutting edge, a pair of closely spaced strip means disposed in said body and arranged to extend the length of said body and inwardly from the surfaces of the triangular portion on opposite sides of the cutting edge, a first alloy having a relatively high resistance to wear forming a part of the body between the pair of strip means, a second alloy having a relatively low resistance to wear forming part of the triangular portion of the body adjacent the sides of the pair of strip means remote from each other, and another alloy having a resistance to wear intermediate said first and second alloys forming the remainder of said triangular portion and rectangular portion of said body.

5. A cutting insert for rock drill bits comprising, a body having a portion substantially rectangular in shape in cross section and an integral portion substantially triangular in cross section, said triangular portion forming at the apex thereof a cutting edge, a pair of closely spaced metal strips disposed in said body and arranged to extend the length of said body and inwardly from the surfaces of the triangular portion on opposite sides of the cutting edge, a first carbide alloy having a relatively high resistance to wear forming a part of the body between the pair of metal strips, a second carbide alloy having a relatively low resistance to wear forming part of the triangular portion of the body adjacent the surfaces of the pair of metal strips remote from each other, and another carbide alloy having a resistance to wear intermediate said first and second carbide alloys forming the remainder of said triangular and rectangular portions of said body.

6. The cutting insert of claim 5 wherein a plate of U-shape in cross section is disposed in the rectangular portion of said body so as to reinforce the same and thereby render the latter resistant to relatvely high impact shocks.

7. The cutting insert of claim 5 wherein each of said metal strips comprises two portions lying in planes at an obtuse angle to each other and wherein said strips are positioned so that corresponding portions of each strip are parallel to each other and the other corresponding portions of each strip extend away from each other.

8. A cutting insert for rock drill bits comprising, a body having a bottom wall, side walls, and inclined top surfaces forming a longitudinal cutting edge, a pair of closely spaced metal strips disposed in said body and arranged to extend the length of the body and inwardly from the inclined top surfaces on opposite sides of the cutting edge, a first carbide alloy of a relatively low cobalt content so as to have a relatively high resistance to wear forming a portion of the body between said metal strips, a second carbide alloy having a relatively high percentage of cobalt so as to have a relatively low resistance to wear and a high resistance to impact stresses forming a portion of the body adjacent the sides of the metal strips remote from each other, and a third carbide alloy having a cobalt content intermediate the first and second alloys forming the remaining portion of the body.

9. The cutting insert of claim 8 wherein a metal reinforcing strip is disposed approximately in the central part of said body and a reinforcing element U-shape in cross section is disposed in the body adjacent the bottom wall of the body.

References Cited by the Examiner
UNITED STATES PATENTS

| | | | |
|---|---|---|---|
| 1,671,052 | 5/28 | Sterk et al. | 175—409 |
| 2,669,432 | 2/54 | Dill et al. | 175—410 |
| 2,842,342 | 7/58 | Haglund | 175—410 |

BENJAMIN HERSH, *Primary Examiner.*